May 20, 1958 R. W. FOLEY 2,835,420
SHUTTER BAR FOR FERTILIZER SPREADER
Filed Feb. 17, 1955 3 Sheets-Sheet 1

INVENTOR.
Russell W. Foley
BY
Attorney

May 20, 1958 R. W. FOLEY 2,835,420
SHUTTER BAR FOR FERTILIZER SPREADER
Filed Feb. 17, 1955 3 Sheets-Sheet 2

INVENTOR.
Russell W. Foley
BY
Attorney

United States Patent Office 2,835,420
Patented May 20, 1958

2,835,420

SHUTTER BAR FOR FERTILIZER SPREADER

Russell W. Foley, Maywood, Ill.

Application February 17, 1955, Serial No. 488,941

8 Claims. (Cl. 222—485)

This invention relates to a fertilizer spreader and particularly to a novel construction of a shutter bar therefor.

Although fertilizer spreaders are ordinarily designed to distribute powdered fertilizer at the rate of several hundred pounds per acre they are frequently called upon to distribute certain necessary fertilizer elements at a much reduced rate. They are also called upon at times to double as seeders for small grains, grasses and legumes, the rate of feed of the seeds being at a still further reduced rate. Due to the weight of fertilizer normally handled in one loading, the means used to adjust the rate of feed must be rugged to withstand the pressure and abrasion of the fertilizer and the frequent opening and closing of the feed mechanism attendant upon passing over portions of the ground which are not to be treated. It is difficult therefore if not impossible with the fertilizer spreaders as presently designed to provide uniform accuracy of rate of feed for extremely low rates of feed as well as for the higher rates.

In such presently available spreaders which are capable of adjustment to a low rate of flow, the means for making an adjustment is so sensitive as to make it very difficult to locate the adjusting means at the setting for the desired flow rate. Furthermore, the construction of the shutter which controls the rate of flow is such that when adjusted to a low rate of flow there is a pronounced tendency to clog and thereby make the flow of fertilizer or seeds erratic.

It is an object of this invention to provide a variable feed mechanism for a fertilizer spreader or the like capable of distributing finely granulated substances or relatively fine seeds such as grass seeds with uniformity and accuracy for very low as well as very high rates of feed per acre.

Another object of this invention is the provision of a design of shutter for regulating the rate of flow of fertilizer or other substances from a spreader wherein clogging of the shutter at low rates of flow is substantially eliminated.

As a more specific object, this invention seeks to provide means for adjusting the rate of feed of seeds or granular or powdered fertilizer from the hopper of a fertilizer spreader which, for a given increment of movement of the adjusting mechanism, will produce a relatively large change in the rate of feed over one range of movement of the mechanism, and over another range will produce a much lesser variation in the rate of feed, thereby eliminating the need for great accuracy in the operation of the adjusting mechanism.

As another object this invention seeks to provide a shutter bar for a fertilizer spreader which may be used with the hoppers of fertilizer spreaders presently available, which will provide instant cut off of flow from the hopper, will not clog, and which will readily provide very accurate adjustments for very low rates of feed of material from such hopper.

These and other objects of this invention will become apparent from the following detailed description when taken together with the accompanying drawings in which, Fig. 1 is a fragmentary elevational view, in section, of a hopper of a fertilizer spreader and the agitator and shutter bar mechanism used therewith;

Figure 4:
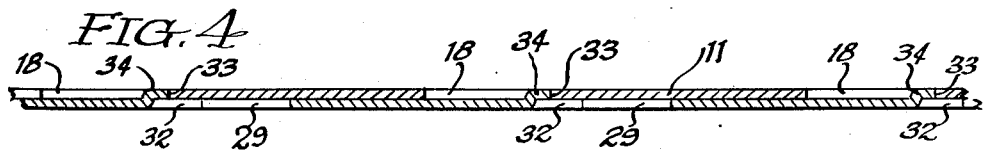
Figs. 4, 5 and 6 are fragmentary sectional views through the bottom of the hopper and through the adjacent shutter bar mechanism showing the latter in various positions relative to the bottom of the hopper.
Figure 5:
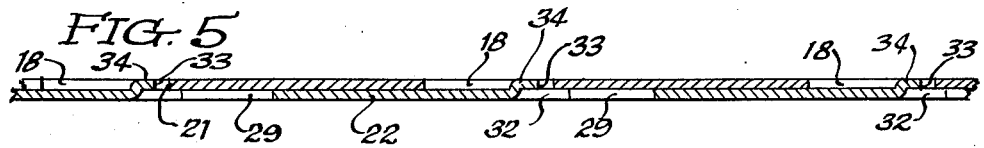
Figure 6:
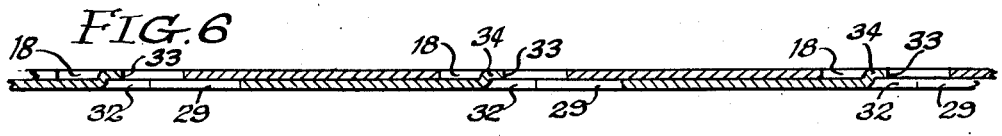
Figure 8:
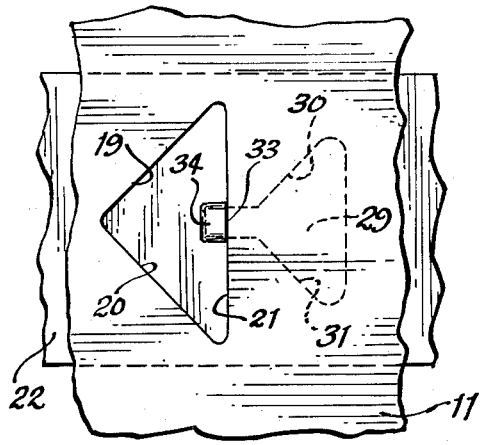
Figure 9:
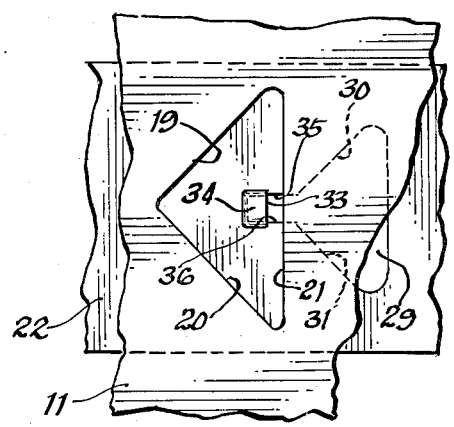
Figure 10:
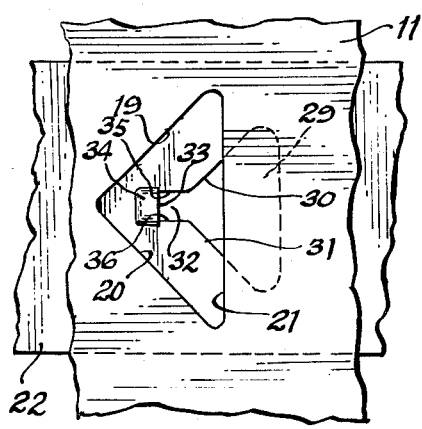
Figure 11:
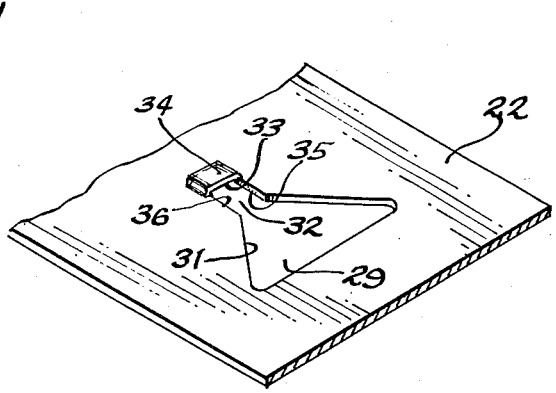

Figs. 8, 9 and 10 are fragmentary plan views corresponding to Figs. 4, 5 and 6, respectively, showing the relative positions of the shutter bar and adjacent hopper openings for closed, fine feed, and coarse feed positions of the shutter bar; and Fig. 11 is a perspective view of a portion of the shutter bar shown in flat form and illustrating the construction of the stop used to indicate the closed position of the shutter.

Figure 1:
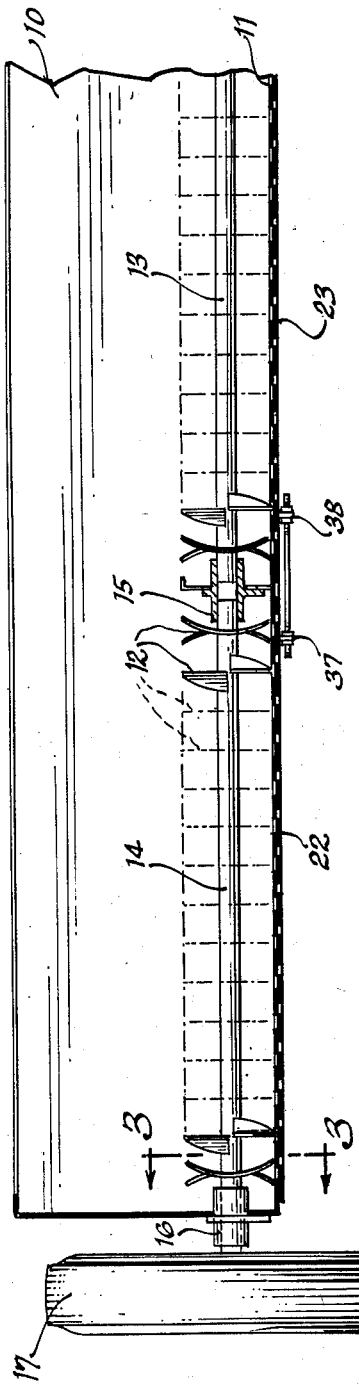

In the embodiment shown for illustrative purposes in the accompanying drawings the fertilizer spreader is comprised of a hopper 10 of generally trough shape in vertical section, the bottom 11 of which is rounded to accommodate the rotating agitators 12 operating in close proximity thereto. Agitators 12 are mounted on and spaced along shafts 13 and 14 supported within hopper 10 on an inboard bearing 15 and outboard bearings 16. The right and left halves of the fertilizer spreader are substantially identical and therefore the left half as viewed in Fig. 1 is reproduced substantially completely, the right half being partly omitted for simplicity. Shaft 14 extends through bearing 16 and is secured to a wheel 17 by which the spreader may be rolled over the ground.

The bottom 11 of hopper 10 has aligned and substantially equidistantly spaced perforations or openings 18 therein, the shape of the openings being generally that of a right isosceles triangle having its two equal sides, 19 and 20, approximately 90° apart, and its third side or hypotenuse 21 disposed substantially at right angles to the axis of shaft 14. It is contemplated that the material in hopper 10 will be fed through openings 18 as permitted by the shutter mechanism hereinafter to be described.

The shutter is preferably comprised of two substantially identical sheets of steel 22, 23 curved to fit around bottom 11, and of a width in a fore-and-aft direction which is greater than the length of hypotenuse 21. Each shutter is held in place over openings 18 by spaced guides 24, 25 comprised, in general, of strips of sheet metal 26 secured to bottom 11 by welding or otherwise, and having offset tabs 27 integrally formed therewith and extending over the shutters. To reduce friction between tabs 27 and the shutter held thereby, contact between the tab and shutter is limited to small bosses 28 formed in tabs 27, and extending inwardly toward the shutter. Said bosses also provide a self-cleaning feature to prevent an accumulation of the material of the hopper between the tabs and shutter.

Figure 7:
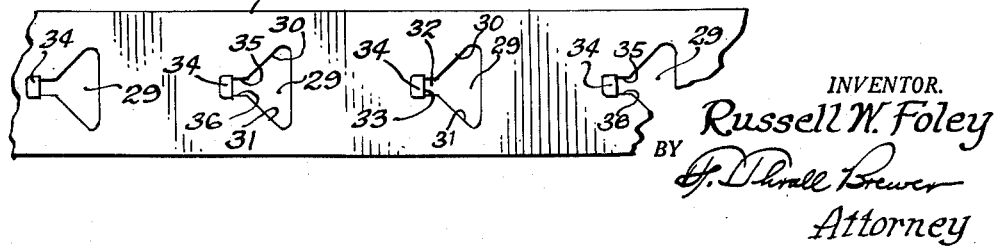
Fig. 7 is a view of a fragment of the shutter mechanism.

Each shutter has formed therein (Fig. 7) a plurality of aligned openings 29 which are spaced apart a distance equal to the distance between adjacent openings 18 in the bottom of hopper 10. Each opening 29 is of substantially the same shape as opening 18 but of smaller dimension. Where the equal sides 30 and 31 would meet, however, there is formed a rectangular notch 32 one side of which opens into opening 29 and the opposite side 33 of which is defined by the edge of a boss 34 which extends into opening 18. The remaining two sides 35 and 36 of the notch are substantially parallel with the axis of shaft 14.

As shown in Figs. 4, 5 and 6, by sliding a shutter relative to bottom 11, openings 18 and 29 can be made to become progressively misaligned until shutter 22 completely blocks opening 18 and thereby prevents further passage of material out of hopper 10. This complete shut-off position is established when edge 33 of boss 34 contacts edge 21 of opening 18 as shown in Fig. 4. A movement of shutter 22 to the left as viewed in Figs. 5 and 6 exposes a progressively greater area of opening 18, thereby permitting raw material to flow out of hopper 10. It may be observed, however, that for a given increment of movement of shutter 22 to the left as viewed in Figs. 5 and 6 while edge 21 passes through rectangular notch 32, a relatively small increment in the increase of the flow is established. When, however, edge 21 passes over the triangular opening 29, the rate of increase of flow per increment of lateral movement of the shutter increases over that established while it was passing over notch 32. Thus, for a given movement of the control member for the shutter during an adjustment for a fine feed, greater accuracy of feed can be obtained than for the same movement of the adjusting means for the heavier or coarser feeds.

Lateral movement of shutters 22 and 23 is effected simultaneously by a common control. To this end, each shutter is provided with a downwardly extending flange 37, 38 connected by tie rods 39, 40 which pass through suitable openings in flanges 37 and 38 and which are threaded at their ends and locked to the flanges by nuts disposed on either side of each flange. The threaded ends and nuts provide means for adjusting the spacing between flanges 37 and 38 and hence permits an adjustment of each shutter relative to openings 18 in the hopper to provide the same rate of flow on both sides of the hopper.

Figure 2:
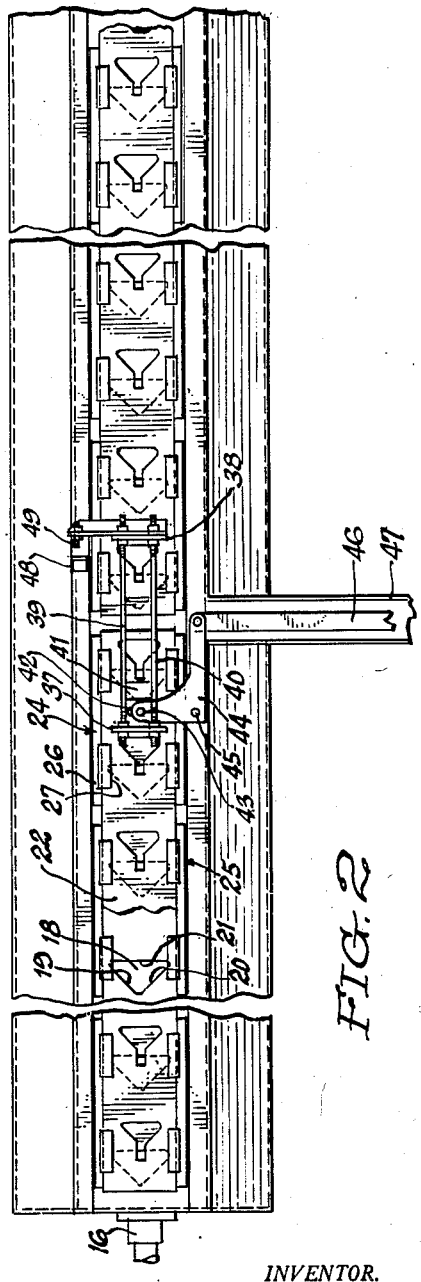
Fig. 2 is a fragmentary bottom view of the shutter bar mechanism and of some of the controls therefor.
Figure 3:
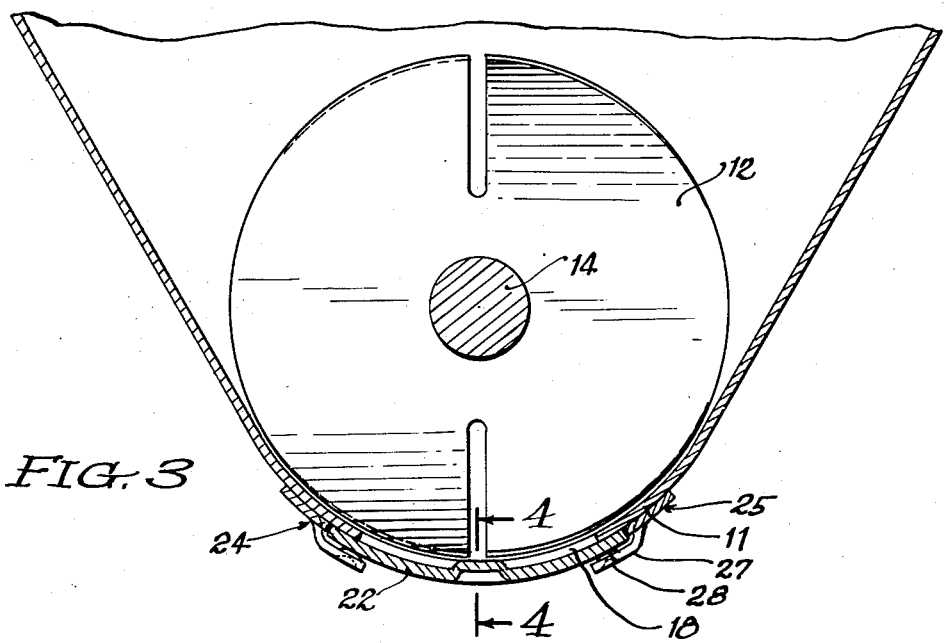
Fig. 3 is an enlarged fragmentary sectional side elevational view of the bottom portion of the spreader of Fig. 1.

Tie rods 39 and 40 are connected together by a plate 41 appropriately welded to the tie rods and formed with an opening 42 into which extends a pin 43 mounted in the end of one arm of a bell crank 44. Said bell crank is pivoted at 45 to hopper 10, and end 45 of its other arm is pivotally connected to a control rod 46 extending within reach of the operator and disposed under the spreader draw bar 47. It may be apparent that reciprocating movement of control arm 46 toward and away from hopper 10 results in oscillatory movement of bell crank 44 which in turn causes reciprocation of plate 41 and, through its associated tie bars 39 and 40, of shutters 22 and 23 in their guides 24, 25. Movement of control arm 46 downwardly as viewed in Fig. 2 thus causes shutters 22 and 23 to move in a direction completely to close openings 18. The closed position is positively felt by the operator when the bosses 34 strike the edge 21 of openings 18.

The means for bringing shutters 22 and 23 to the precise same location relative to openings 18 after the openings have been closed comprises a stop 48 on hopper 10, the position of which relative to openings 18 may be adjusted by any of the well known calibrated adjusting means currently available on spreaders. Since the adjusting means is standard it will not be described herein in detail. Stop 48 is disposed in the path of movement of a stud 49 mounted on the end of an angle iron 50 secured to flange 38 for movement therewith. The area of opening established by the relative positions of shutters 22 and 23 and their adjacent openings 18 is dependent upon the distance stud 49 is permitted to move by stop 48 from the position corresponding to closed position of shutters 22 and 23.

It may be apparent from the foregoing description that different rates of feed for a given movement of control arm 46 may be established by varying the contour of the openings 29 in the shutter bar. The form shown is particularly adapted to two rates of feed, one very fine for either a very fine distribution of fertilizer or for seeding small grains and other plants having very fine seeds, and the other for relatively heavy applications of fertilizer per acre. The fine adjustment is very accurate despite the fact that it is associated with a control for applying relatively large amounts of fertilizer per acre which ordinarily requires but a coarse adjusting means.

A very important feature of the hereinabove described shutter design is that it is substantially free of clogging at fine feed settings. This is brought about by the fact that edge 33 on shutter 22, for example, abuts edge 21 on hopper bottom 11 when a shutter is in its closed position instead of sliding under said edge 21 as would be the case if edge 33 were not raised out of the plane of the shutter. With the upper surface of boss 34 coplanar with the inner surface of hopper bottom 11, agitators 12 can scrape the abutting edges 21 and 33 and prevent the packing of the hopper contents thereat. If the boss were not present, agitators 12 could not come closer to the upper surface edge 33 than the thickness of the material of bottom, with the result that the material would adhere to edge 21, and also to edge 33 if a small separation of these edges were effected at the time, and thereby produce a clogged condition.

It is understood that the foregoing description is merely illustrative of a preferred embodiment of the invention and that the scope of the invention therefore is not to be limited thereto but is to be determined by the appended claims.

I claim:

1. In combination, an elongated hopper having openings in the bottom thereof through which the contents of the hopper are adapted to flow, and shutter means movable across the openings to vary the effective size of the openings and thereby to vary the rate of flow of the contents of the hopper through said openings, said shutter means having openings therein adapted to be placed in various positions of registry with the openings in the hopper, ranging from a position corresponding to a completely closed condition of the hopper openings to a position corresponding to a fully open position, the openings in the shutter being smaller than the openings in the hopper and being progressively narrower from one end to a region near the other end and then substantially rectangular throughout said region to said other end whereby the rate of change of effective area of the openings in the hopper per uniform increment of movement of the shutter means is lower near the closed position than it is near the open position of the shutter.

2. In combination, an elongated hopper having openings in the bottom thereof through which the contents of the hopper are adapted to flow, and shutter means movable across the openings to vary the effective size of the openings and thereby to vary the rate of flow of the contents of the hopper through said openings, said shutter means having openings therein adapted to be placed in various positions of registry with the openings in the hopper, ranging from a position corresponding to a closed condition of the hopper openings to a position corresponding to a fully open condition of said hopper openings, and means on the shutter extending into the openings in the hopper and disposed at one end of one of the openings in the shutter and adapted to strike the wall defining the opening in the hopper when the shutter is in a position corresponding to a closed condition of the openings in the hopper.

3. In combination, an elongated hopper having openings in the bottom thereof through which the contents of the hopper are adapted to flow, and shutter means movable across the openings to vary the effective size of the openings and thereby to vary the rate of flow of the contents of the hopper through said openings, said shutter means having a rectangular opening and a triangular opening adjacent one another and forming one continuous opening, the rectangular opening being disposed at an apex of the triangular opening, the openings in the shutter means being adapted to be placed in various positions of registry with the openings in the hopper ranging from a position corresponding to a closed condition of the hopper openings to a position corresponding to a fully open condition of said hopper openings, stop means disposed at and defining one end of the rectangular opening and extending into the opening in the hopper and adapted to contact a wall thereof to limit the movement of the shutter means toward closed position, said rectangular opening providing a smaller rate of change of effective area of the openings in the hopper per uniform increment of movement of the shutter means than the triangular opening for the same increment of movement of the shutter means.

4. In combination, an elongated hopper having triangular openings in the bottom thereof through which the contents of the hopper are adapted to flow, said openings being disposed with one side of the triangle extending in a direction transverse to the long axis of the hopper, and shutter means movable across the triangular openings to vary the effective size of said openings and thereby to vary the rate of flow of the contents of the hopper through the said openings, said shutter means having triangular openings therein with the sides thereof disposed parallel to the sides of the openings in the hopper, the shutter openings being adapted to be placed in registry with the openings in the hopper, said shutter as it moves across the openings in the hopper changing the degree of registry of said hopper and shutter openings from complete unregistry corresponding to a closed position of the hopper openings to complete registry corresponding to a fully open position of the hopper openings, a rectangular notch formed at the apex region of each of the openings in the shutter means opposite the side thereof which is transverse to the long axis of the elongated hopper, and a boss formed on the shutter at the end of each rectangular notch and extending into the openings in the hopper and adapted to contact the said side of the hopper openings disposed transversely of the long axis of the hopper to act as a stop to limit the movement of the shutter toward closed position.

5. In combination, a hopper having openings in the bottom thereof through which the contents of the hopper are adapted to flow, and shutter means movable along the bottom of the hopper and having openings therein adapted to be placed in various positions of registry with the openings in the hopper including a position wherein the shutter openings are completely out of registry with the hopper openings and the latter are therefore completely closed, said shutter and hopper openings being disposed in different planes, and means defining one side of one of said openings and extending into the opening adapted to be placed in registry with said one of said openings, such that said means is adapted to abut on a side of the opening into which it extends when the shutter openings are completely out of registry with the hopper openings.

6. The combination as described in claim 5, said means defining one side of one of said openings comprising a boss struck from the shutter and extending into a hopper opening.

7. The combination as described in claim 5, said means defining one side of one of said openings comprising a straight-sided boss struck from the shutter and extending into a hopper opening having a straight side parallel with and adapted to be contacted by the straight side of the boss when the shutter and hopper openings are in closed position as aforesaid.

8. The combination as described in claim 5, said hopper bottom being comprised of sheet metal, said hopper openings comprising triangular perforations in the sheet metal having one side of the triangle normal to the path of movement of the shutter, and said means defining one side of one of said openings comprising a straight-sided boss struck from the shutter and extending into a hopper opening, the surfaces of the boss and sheet metal bottom within the hopper being coplanar, the straight side of the boss being parallel with the side of the triangle which is normal to the path of movement of the shutter, and the straight side of the boss being adapted to abut the side of the triangular opening which is normal to the path of movement of the shutter.

References Cited in the file of this patent

UNITED STATES PATENTS

| | | |
|---|---|---|
| 2,200,733 | Finne | May 14, 1940 |
| 2,510,231 | Juzwiak | June 6, 1950 |
| 2,678,145 | Juzwiak et al. | May 11, 1954 |
| 2,701,665 | Raught | Feb. 8, 1955 |